(12) United States Patent
Mori (10) Patent No.: US 6,408,890 B1
(45) Date of Patent: Jun. 25, 2002

(54) HOSE CONNECTING STRUCTURE

(75) Inventor: Hiroyoshi Mori, Iwakura (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/690,894

(22) Filed: Oct. 18, 2000

(30) Foreign Application Priority Data

Oct. 26, 1999 (JP) .............................................. 11-304005

(51) Int. Cl.⁷ ................................................. F16L 11/08
(52) U.S. Cl. ........................ 138/126; 138/109; 138/125; 285/286.2; 285/332
(58) Field of Search ................................. 138/125, 126, 138/109; 285/133.5, 133.4, 290.1, 919, 332, 286.2

(56) References Cited

U.S. PATENT DOCUMENTS

| | | | | |
|---|---|---|---|---|
| 2,805,088 A | * | 9/1957 | Cline et al. .................. | 285/239 |
| 3,210,100 A | * | 10/1965 | Lowles et al. .............. | 285/239 |
| 3,252,720 A | * | 5/1966 | Waite .......................... | 138/125 |
| 3,653,692 A | | 4/1972 | Henson ....................... | 285/242 |
| 3,711,130 A | | 1/1973 | Betzler ....................... | 285/239 |
| 3,759,445 A | * | 9/1973 | King ........................... | 285/236 |
| 3,966,238 A | * | 6/1976 | Washkewicz et al. ....... | 138/125 |
| 4,905,736 A | * | 3/1990 | Kitami et al. ............... | 138/109 |
| 5,143,122 A | * | 9/1992 | Adkins ........................ | 138/109 |
| 5,348,779 A | * | 9/1994 | Igarashi ...................... | 138/125 |
| 5,358,012 A | * | 10/1994 | Kish ........................... | 138/109 |
| 5,413,147 A | * | 5/1995 | Moreiras et al. ............ | 138/109 |
| 5,685,345 A | * | 11/1997 | Gieseke et al. ............. | 138/109 |

FOREIGN PATENT DOCUMENTS

| | | |
|---|---|---|
| DE | 69 42 443 | 3/1970 |
| DE | 196 53 257 | 6/1998 |
| JP | 4-331894 | 11/1992 |
| JP | 9-159077 | 6/1997 |

OTHER PUBLICATIONS

Patent Abstracts of Japan; vol. 1997, No. 02, Feb. 28, 1997; 08 270857; Oct. 15, 1996.

Patent Abstracts of Japan; vol. 1998, No. 14, Dec. 31, 1998; 10 231977; Sep. 2, 1998.

* cited by examiner

*Primary Examiner*—James Hook
(74) *Attorney, Agent, or Firm*—Jacobson Holman, PLLC (57) ABSTRACT

A hard pipe has an annular stop projection formed about its portion press fitted in a flexible hose to make a hose connecting structure. The projection has a cross sectional contour including a gentle outward slope extending from the front end of the projection to a first corner, which makes the angle of the subsequent second corner gentle, and a rear face at the second corner extending inwardly toward the longitudinal axis of the pipe at right angles thereto. The hose connecting structure has high levels of pull-out strength and sealing properties without having the hose damaged by the projection on the pipe.

19 Claims, 5 Drawing Sheets

FIG. 1

PRIOR ART

FIG. 2

PRIOR ART

FIG. 3

PRIOR ART

HOSE CONNECTING STRUCTURE

BACKGROUND OF THE INVENTION

1. Field of the Invention:

This invention relates to a hose connecting structure obtained by press fitting a hard pipe into a flexible hose, such as of rubber, while expanding the latter radially to a certain extent. This type of structure is often employed for connecting, for example, hoses and a branched hard pipe in an automobile engine compartment.

Figure 1:
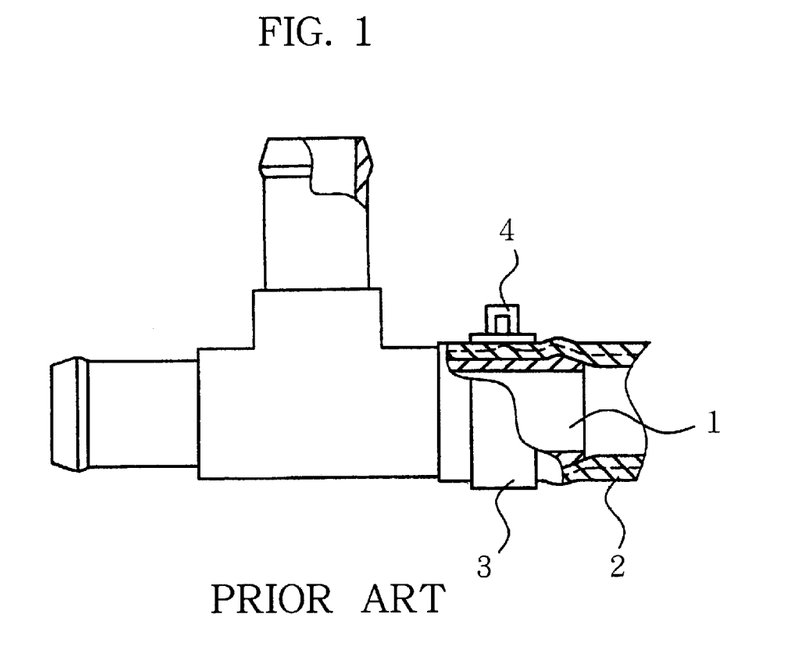
FIGS. 1 to 3 are all sectional or partly sectional views of a known hose connecting structure.

2. Description of the Related Art:

In an assembly in which a hard pipe is simply press fitted into a flexible hose, the hose is likely to slip off easily. Therefore, various proposals have been made to join a hose to a pipe in such a way that the hose may not easily slip off the pipe. For example, an adhesive is employed for bonding the inner surface of a hose to the outer surface of a pipe. According to another proposal, an O-ring is interposed between a flexible hose and a hard pipe. Still another proposal is shown in FIG. 1, which relies upon a clip 3 fitted about a hose 2 for holding it against a pipe 1 press fitted in the hose 2. These methods are, however, generally not satisfactory in working efficiency, and they do not always make a hose connecting structure which is satisfactory in pull-out strength and sealing properties. Moreover, a lug 4 projecting from the clip 3 is an obstacle in, for example, engine compartments of recent automobiles having a high density of installed items.

Figure 2:
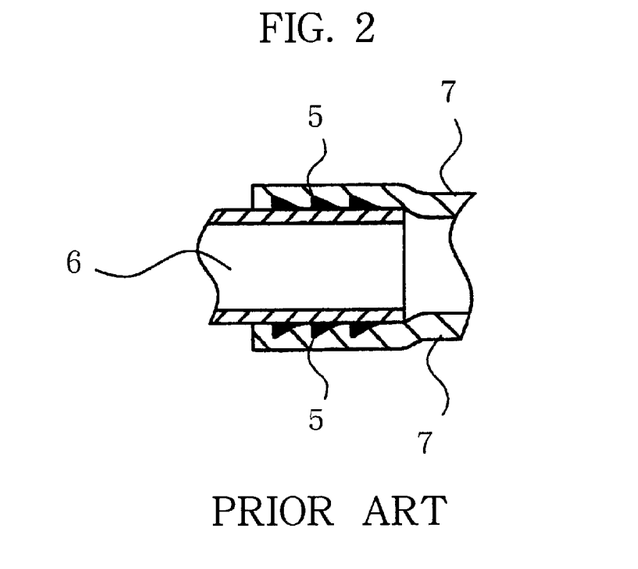
Figure 3:
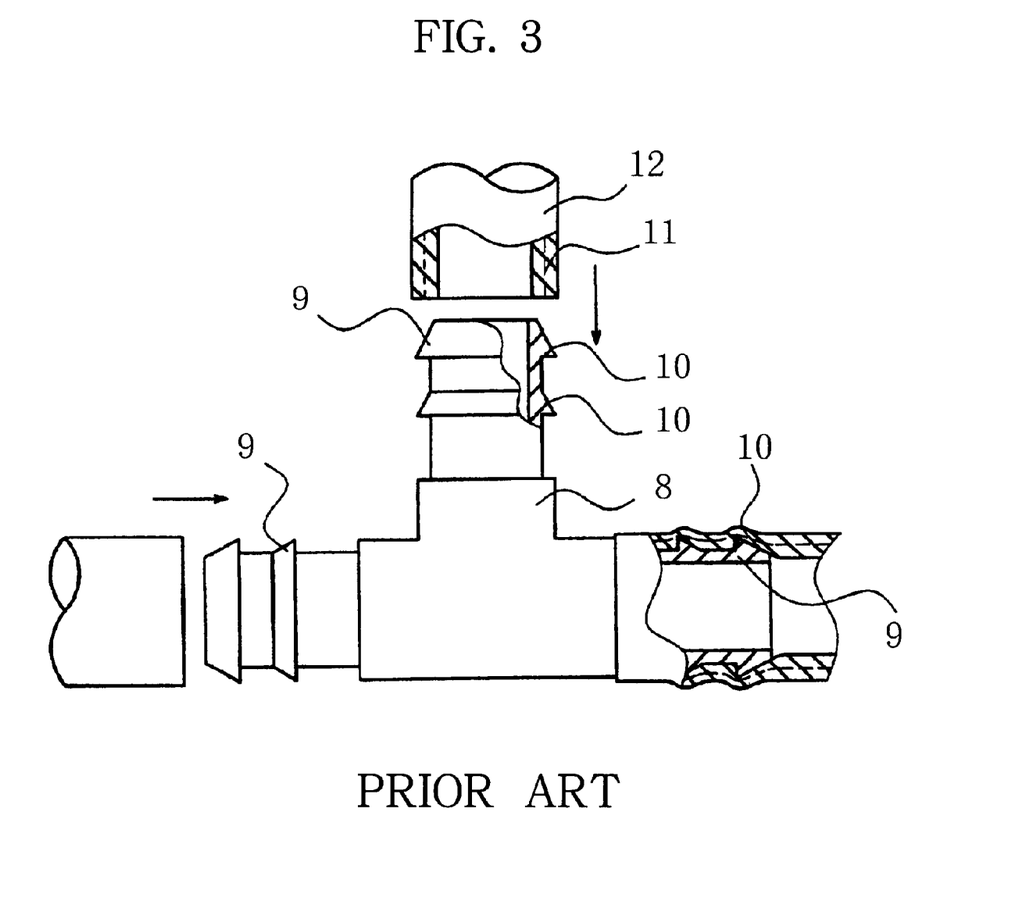

An assembly proposed more recently to overcome those problems is obtained by press fitting a hard pipe having stoppers projecting from its outer periphery into a flexible hose. For example, Japanese Patent Application Laid-Open No. 331894/1992 discloses a hard pipe 6 having stoppers 5 formed on its outer periphery by exchange mold injection from a soft material, and pressed fitted in a flexible hose 7, as shown in FIG. 2. Japanese Patent Application Laid-Open No. 159077/1997 discloses a branched pipe 8 of a hard material having three branches 9 each having formed on its outer periphery stop ridges 10 each having a cross section terminating in a sharp edge, each branch 9 being press fitted in a flexible hose 12 having a reinforcing fiber layer 11 in its wall, as shown in FIG. 3.

The methods as disclosed in those two Japanese patent applications are better in working efficiency than the previously known ones as described before, since the connecting work is completed merely by press fitting a pipe into a hose. They are, however, still not always satisfactory in pull-out strength and sealing properties. In Japanese Patent Application Laid-Open No. 331894/1992, the stoppers 5 as shown in FIG. 2 are formed separately from the pipe 6, and even if the advantages of their exchange mold injection may be taken into account, a strong pull-out force acting upon the assembly is likely to cause the stoppers 5 to come off the pipe 6 or become displaced and thus it is feared that the assembly will not maintain satisfactory pull-out strength and sealing properties. In Japanese Patent Application Laid-Open No. 159077/1997, the ridges 10 as shown in FIG. 3 form integral parts of the pipe, but their hard and sharp edges are held against the inner surfaces of the hoses 12 so tightly that if there is a strong impact upon the assembly, the hoses 12 may be damaged by the edges of the ridges 10 and lose sealing properties. As each hose is expanded to a greater diameter when fitted about the pipe, the edges of the ridges 10 are held against the wall of the hose 12 more tightly, and are more likely to damage the hose.

SUMMARY OF THE INVENTION

It is, therefore, an object of this invention to overcome all of the various drawbacks as pointed out above with respect to a hose connecting structure obtained by press fitting a hard pipe into a flexible hose while expanding the latter radially.

According to a first aspect of this invention, there is provided a hose connecting structure comprising a flexible hose having a reinforcing fiber layer in its wall, and a hard pipe a portion of which is press fitted in the hose, wherein the pipe has an annular stop projection formed about its press fitted portion, and having a cross sectional contour including a gentle outward slope from the front end of the projection toward the rear end side to a first corner, which makes the angle of the subsequent second corner gentle, and a rear face at this second corner extending inward toward the longitudinal axis of the pipe at right angles thereto, forming an annular depression.

The structure can be made with high working efficiency using a method in which the hard pipe is press fitted into the flexible hose while the hose is radially expanded. Even if a strong pull-out force may act upon the assembly, the stop projection forming an integral part of the pipe does not come off, or become displaced, but the assembly maintains its pull-out strength and sealing properties.

Figure 4A:
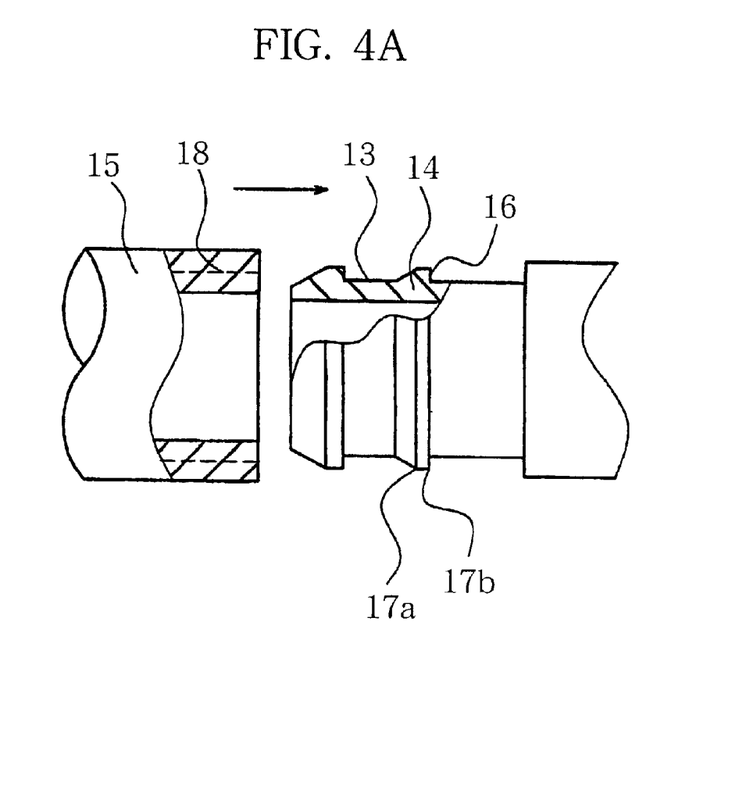
FIGS. 4A and 4B are a set of partly sectional views illustrating the operation of a hose connecting structure according to this invention.

The structure further has the following advantages:

(1) The stop projection 14 having a gentle slope from the front end toward the rear end side in its cross sectional contour, as shown in FIG. 4A, facilitates the press fitting of the pipe 13 into the hose 15.

Figure 4B:
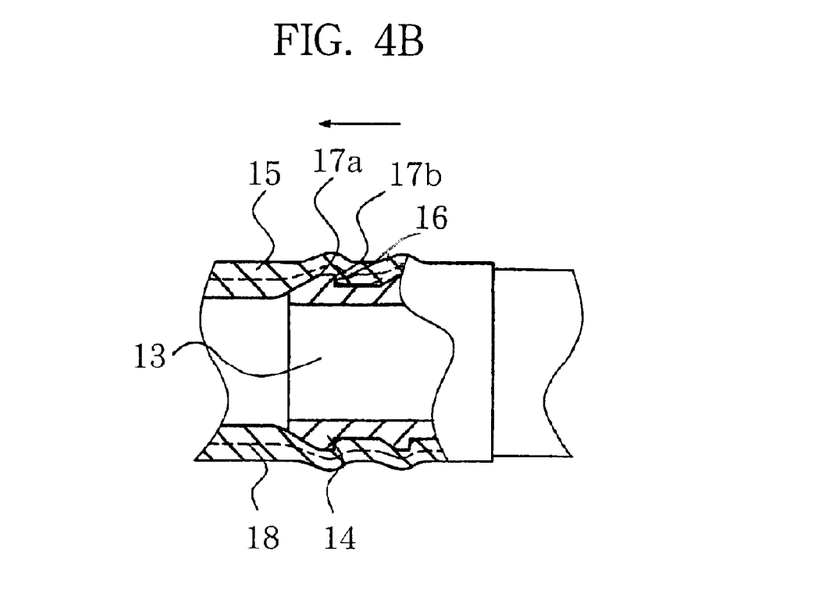

(2) The stop projection 14 having in its cross sectional contour a rear face 16 extending from the second corner 17b toward the central longitudinal axis of the pipe 13 at right angles thereto ensures the high pull-out strength and sealing properties of the structure, since the rear face 16 engaging the inner surface of the hose 15 resists strongly any pull-out force acting upon it, as is obvious from FIG. 4B. In this connection, the second corner 17b is not necessarily required to have a sharp angle which is by far smaller than 90°, but the projection 14 is effective if the second corner 17b has an angle of, say, 70° to 110°.

(3) The second corner 17b of the stop projection 14 has its angle enlarged by the presence of its first corner 17a. It is, therefore, possible to avoid any damaging of the hose by a sharp projection and any resulting lowering of sealing properties as pointed out before in connection with the assembly disclosed in Japanese Patent Application Laid-Open No. 159077/1997.

The hose 15 has a reinforcing fiber layer 18 in its wall. The reinforcing fiber layer 18 does not, however, present any resistance to the press fitting of the pipe 13, since the hose 15 is radially expanded when the pipe 13 is press fitted therein, as is obvious from (1) above. If a pull-out force acts upon the structure, the hose 15 is caused to contract radially, and the reinforcing fiber layer 18 holds the inner surface of the hose 15 strongly against the stop projection 14 to enhance the pull-out strength of the assembly, as is obvious from (2) above. It is, however, possible to avoid any damaging of the hose 15, as is obvious from (3) above.

According to a second aspect of this invention, the hose is radially expanded by at least 20% when the pipe is press fitted thereinto. The radial expansion of the hose to such an extent ensures the still higher pull-out strength and sealing properties of the assembly, while it is still possible to avoid any damaging of the hose by the stop projection on the pipe and any resulting lowering of sealing properties, as explained above.

According to a third aspect of this invention, at least an innermost wall layer of the hose is formed from an elastomer having a tear strength of at least 20 N/mm, such as EPDM (an ethylene-propylene-diene terpolymer) or EPM (an ethylene-propylene copolymer). If the hose is radially expanded by a very high percentage (say, 30 to 50%), there is some possibility or other of the hose being damaged by the stop projection on the pipe, even if its second corner may have an enlarged angle as stated before. The elastomer is effective for protecting the hose under such circumstances.

According to a fourth aspect of this invention, the reinforcing fiber layer has a pull-out strength of at least 0.3 N/mm. The radial expansion of the hose by a very high percentage may cause the separation of the reinforcing fiber layer from the wall of the hose or its displacement and thereby lower the sealing properties of the assembly. However, no such separation or displacement is likely to occur to any hose with a reinforcing layer having a pull-out strength of at least 0.3 N/mm.

The above and other features and advantages of this invention will become more apparent from the following description and the accompanying drawings.

DETAILED DESCRIPTION OF THE INVENTION

Hose Connecting Structure:

The hose connecting structure of this invention can be employed for connecting a hose to a pipe in any field of art. A typical example of its application is, however, the joining of a hose to a radiator, or heater in an automobile engine compartment. The pipe may be of the branched or non-branched type. Hard Pipe:

The hard pipe may be a branched or non-branched one having an annular stop projection formed about the portion press fitted in the hose. The pipe may, for example, be of hard nylon, such as nylon 6 or 66, reinforced or not reinforced with glass fiber, though it may be of any other appropriate material.

Figure 5:
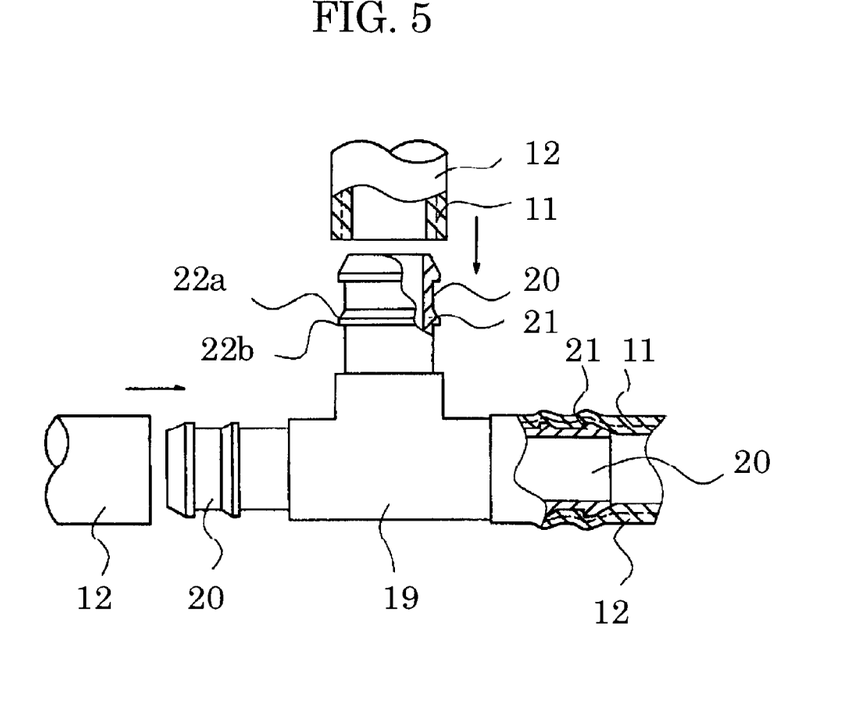
FIG. 5 is a partly sectional view of a hose connecting structure embodying this invention.

FIG. 5 shows by way of example a branched hard pipe 19 having three branches 20 formed each for fitting in a hose. Each branch 20 has an annular stop projection 21 formed thereabout as an integral part thereof. Each projection 21 has a height depending on factors including the percentage by which the hose is radially expanded when the branch 20 is press fitted thereinto.

Each projection 21 has a cross sectional contour including a gentle slope extending from the front end of the projection 21 toward the rear end side to a first corner 22a, and a second corner 22b at the rear end of the projection 21. Due to the first corner 22a, the angle at the second corner 22b is enlarged. The rear face at the second corner 22b extends inward at right angles to the longitudinal axis of the pipe, creating an annular depression. The cross sectional contour of the projection 21 as described is more clearly shown in FIG. 6A. The first corner 22a has such an angle that the top face of the projection 21 may be parallel to a line x parallel to the longitudinal axis of the pipe 19, and that the second corner 22b may have an angle of 90°.

According to this invention, however, the first corner 22a may be of any angle as far as the second corner 22b has a substantially enlarged angle thereby. Therefore, FIG. 6B shows a projection 21 including a first corner 22a having a smaller angle, and a top face inclined inwardly from the line x to form a second corner 22b having an angle exceeding 90° (but not exceeding, say, 110°). FIG. 6C shows another contour of projection 21 including a first corner 22a having a larger angle, and a top face inclined outwardly from the line x to form a second corner 22b having an angle smaller than 90° (but not smaller than, say, 70°).

Figure 6A:
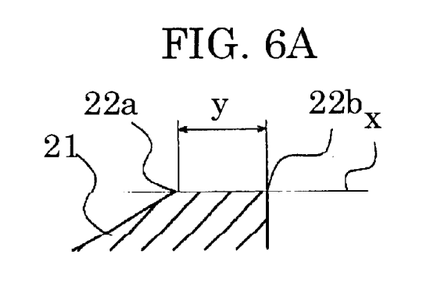
FIGS. 6A to 6C are all schematic views showing different forms of stop projections on a pipe in the structure according to this invention.
Figure 6B:
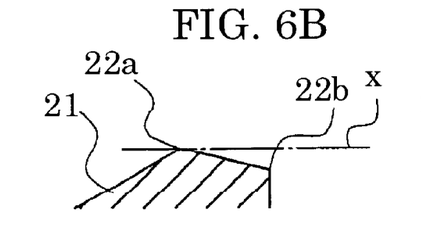
Figure 6C:
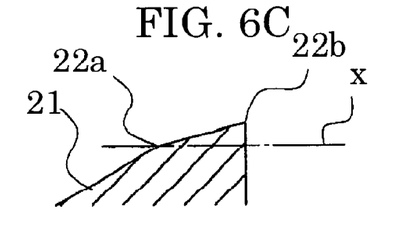

The projection 21 shown in any of FIGS. 6A to 6C is not specifically limited in the distance between its first and second corners 22a and 22b as measured along the line x, or the distance shown at y in FIG. 6A. The effect may, however, be insufficient if the distance y between two corners 22a and 22b is so small as, say, less than 0.5 mm. If the distance y is so large as, say, over 5 mm, the pipe may be difficult to press fit, as it has to overcome a greater resistance.

The hard pipe may be coated with a thin layer of a soft elastomer covering at least its press fitted portion, or its stop projection. This layer is preferably formed by exchange mold injection when the pipe is molded, though it can be formed by any other appropriate method. Hose:

The flexible hose may be of any known material, but preferably contains a reinforcing fiber layer in its wall between the inner and outer surfaces thereof. The reinforcing fiber layer may, for example, be of spirally wound, or braided reinforcing yarn. It may or may not be bonded by an adhesive to the material of the hose.

The reinforcing fiber layer is not specifically limited in its pull-out strength. It, however, preferably has a pull-out strength of at least 0.3 N/mm if the hose is radially expanded by as much as, say, 30 to 50%. Such a strength can be obtained if the layer is of yarn covered with fuzz which may be expected to produce a physical adhesive effect, such as staple yarn or partly stretch broken filament thereof (spunized yarn). It is also effective to use reinforcing yarn dipped in a solution for surface treatment, such as RFL, or to bond yarn to the hose material chemically with an adhesive without dipping it in any such solution. Percentage of Hose Expansion:

The percentage by which the hose is radially expanded to form the hose connecting structure according to this invention can be expressed as $[(A/B)-1] \times 100(\%)$, where A is the maximum outside diameter of the hard pipe (i.e. the outside diameter of its stop projection at its top) and B is the inside diameter of the flexible hose.

It is usual practice to employ a percentage of only, say, 5 to 10% so that the hose may not be damaged by the stop projection on the pipe. According to this invention, however, it is possible to employ a percentage of, say, 20% or even higher and make a structure of high pull-out strength and sealing properties, while avoiding any damaging of the hose by the stop projection on the pipe.

The expansion of the hose by a percentage of as high as, say, 30 to 50% makes it possible to obtain a structure of still higher pull-out strength and sealing properties. Such an expansion is, however, likely to cause the separation of the reinforcing fiber layer from the wall of the hose, or the displacement of its yarn. Therefore, it is preferable for the reinforcing fiber layer to have a pull-out strength of at least 0.3 N/mm, as already stated. Moreover, the hose preferably has an innermost wall layer formed from a material having a tear strength of at least 20 N/mm. Inside Diameter of Hose and Outside Diameter of Pipe at the Edge of its Press Fitted Portion:

The relationship between the inside diameter of the hose and the maximum outside diameter of the pipe depends on the percentage of the hose expansion, as described above. Meanwhile, the inside diameter of the hose and the outside diameter of the pipe at the edge of its press fitted portion are not specifically limited relative to each other.

Figure 7A:
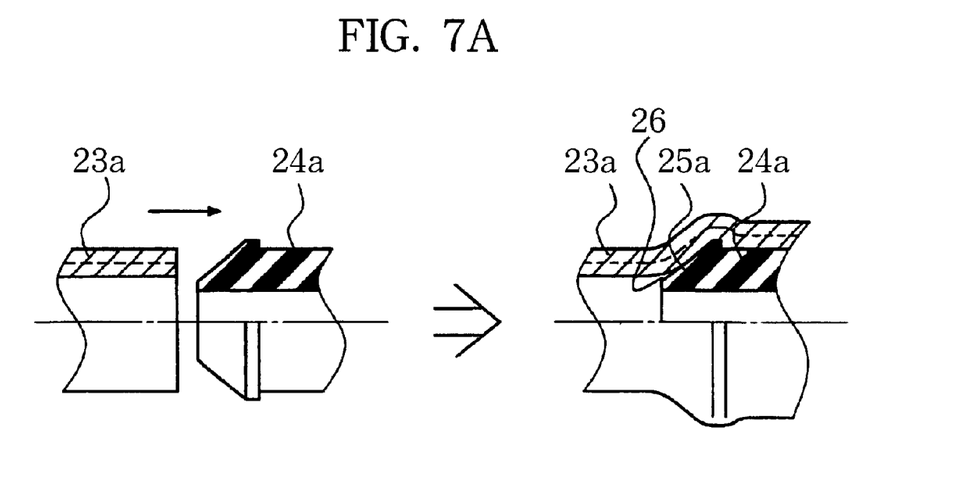
FIGS. 7A and 7B are each a set of partly sectional views showing the operation of a combination of a hose and a pipe in the structure according to this invention.
Figure 7B:
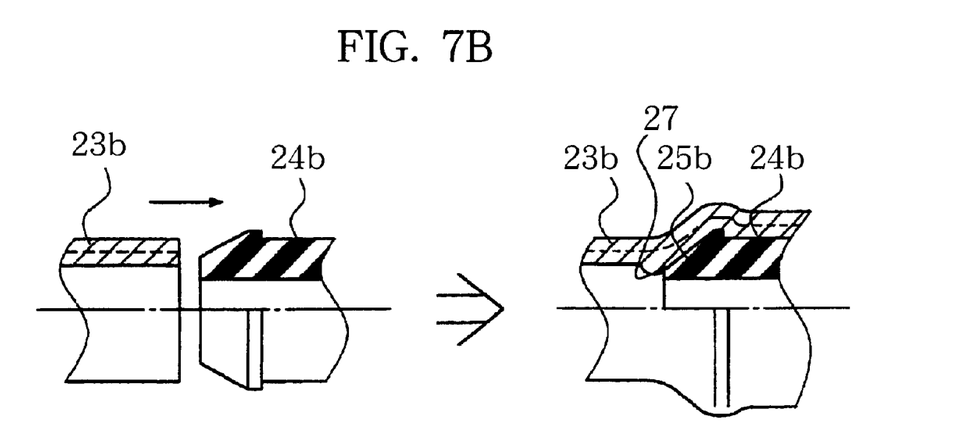

However, if the inside diameter of a hose 23a is larger than the outside diameter of a pipe 24a at the edge of its press fitted portion as shown in FIG. 7A, a clearance 26 having a V-shaped cross section may be formed between the inner surface of the hose 23a and the tapered surface 25a of the pipe 24a over which it is press fitted into the hose. The presence of the clearance 26 will be undesirable for the sealing properties of the structure. FIG. 7B shows a combination of a hose and a pipe which is desirable for the sealing properties. The hose 23b has an inside diameter which is smaller than the outside diameter of the pipe 24b at the edge of its press fitted portion. When the pipe 24b is press fitted into the hose 23b, the inner surface of the hose 23b is thereby caused to have a bulged portion 27 and contact with the entire tapered surface 25b of the pipe so intimately that no clearance may be formed therebetween.

EXAMPLES

Hose connecting structures according to this invention and conventional ones were prepared using a high, in some cases very high, percentage of expansion of the hoses, and are shown at Nos. 1 to 7 in Tables 1 and 2. In the Tables, examples having a stop projection of FIG. 5 are those of the present invention and examples having a stop projection of FIG. 3 or FIG. 1 are comparative ones.

TABLE 1

| | | | Example | | | | | | |
|---|---|---|---|---|---|---|---|---|---|
| | | | 1 | 2 | 3 | 4 | 5 | 6 | 7 |
| Test sample | Flexible hose | Inside diameter/Wall thickness (mm) | 16/4 | 16/4 | 16/4 | 16/4 | 16/4 | 16/4 | 16/4 |
| | | Tear strength (N/mm) of EPDM forming the innermost layer | 35 | 35 | 35 | 35 | 20 | 35 | 35 |
| | | Pull-out strength (N/mm) of thread | 0.5 | 0.5 | 0.5 | 0.5 | 0.5 | 0.5 | 0.5 |
| | Pipe | Stop projection | FIG. 5 | FIG. 5 | FIG. 5 | FIG. 5 | FIG. 5 | FIG. 5 | FIG. 3 (conventional) |
| | | Material | PA66-GF30 | PA66-GF30 | PA66-GF30 | PA66-GF30 | PA66-GF30 | PA66-GF30 | Exchange mold injection product of hard PA66-GF30 and soft TPO*1 |
| | | Max. outside diameter (mm) of its press fitted portion | 19.2 | 20.8 | 22.4 | 24 | 22.4 | 22.4 | 23.4 |
| | | Outside diameter (mm) of its press fitted portion at its edge | 16 | 16 | 16 | 16 | 16 | 17.5 | 16 |
| | Hose connecting structure | Hose expansion (%) | 20 | 30 | 40 | 50 | 40 | 40 | 46.3 |
| Evaluation of structure | Initial properties | Reinforcing yarn at hose end | No changes | No changes | No changes | No changes | No changes | No changes | No changes |
| | | Pull-out load (N) | 450 | 660 | 680 | 640 | 650 | 720 | 570 |
| | | Sealing pressure (MPa) | 1.00 | 1.11 | 1.25 | 1.16 | 1.16 | 1.22 | 1.15 |
| | After impact by a falling weight | Condition of inner surface of hose at pipe projections | No changes | No changes | No changes | No changes | No changes | No changes | No changes |
| | | Pull-out load (N) | 460 | 670 | 700 | 650 | 640 | 730 | 580 |
| | | Sealing pressure (MPa) | 1.02 | 1.13 | 1.19 | 1.16 | 1.13 | 1.26 | 1.11 |

*1Santoprene 191-70PA, olefinic thermoplastic elastomer of A.E.S. (Japan) Co., Ltd.

TABLE 2

| | | | Example | | | | | | |
|---|---|---|---|---|---|---|---|---|---|
| | | | 1 | 2 | 3 | 4 | 5 | 6 | 7 |
| Test sample | Flexible hose | Inside diameter/Wall thickness (mm) | 16/4 | 16/4 | 16/4 | 16/4 | 16/4 | 16/4 | 16/4 |
| | | Tear strength (N/mm) of EPDM forming the innermost layer | 35 | 15 | 35 | 35 | 35 | 20 | 35 |
| | | Pull-out strength (N/mm) of thread | 0.5 | 0.5 | 0.5 | 0.5 | 0.5 | 0.5 | 0.5 |
| | Pipe | Stop projection | FIG. 5 | FIG. 5 | FIG. 5 | FIG. 5 | FIG. 5 | FIG. 3 (conventional) | FIG. 1 (conventional) |
| | | Material | PA66-GF30 | PA66-GF30 | PA66-GF30 | PA66-GF30 | PA66-GF30 | PA66-GF30 | Conventional specifications Clip used for holding hose |
| | | Max. outside diameter (mm) of its press fitted portion | 18.4 | 22.4 | 22.4 | 22.4 | 24.8 | 22.4 | |
| | | Outside diameter (mm) of its press fitted portion at its edge | 16 | 16 | 16 | 15 | 16 | 16 | |

TABLE 2-continued

|  |  |  | Example | | | | | | |
|---|---|---|---|---|---|---|---|---|---|
|  |  |  | 1 | 2 | 3 | 4 | 5 | 6 | 7 |
|  | Hose connecting structure | Hose expansion (%) | 15 | 40 | 40 | 40 | 55 | 40 |  |
| Evaluation of structure | Initial properties | Reinforcing yarn at hose end | In order | In order | Displaced | In order | Displaced | In order | In order |
|  |  | Pull-out load (N) | 220 | 620 | 270 | 260 | 260 | 610 | 490 |
|  |  | Sealing pressure (MPa) | 0.56 | 1.13 | 0.64 | 0.61 | 0.58 | 1.13 | 1.01 |
|  | After impact by a falling weight | Condition of inner surface of hose at pipe projections | Cracked | Cracked |  | No changes |  | Cracked | No changes |
|  |  | Pull-out load (N) | 90 | 120 |  | 250 |  | 180 | 460 |
|  |  | Sealing pressure (MPa) | 0.34 | 0.39 |  | 0.59 |  | 0.43 | 0.98 |

The details under the following items are shown in Tables 1 and 2: flexible hose inside diameter/wall thickness (mm); tear strength (N/mm) of EPDM material used for inner surface layer of flexible hose; pull-out strength (N/mm) of thread in reinforcing fiber layer; construction of pipe stopper projections; material of the pipe; maximum outside diameter (mm) of press fit portion; outside diameter (mm) of press fit portion at its edge; and hose expansion percentage calculated from inner diameter of flexible hose and maximum outside diameter of pipe press fit portion.

Referring to materials of pipes in Tables 1 and 2, PA66-GF30 means a material obtained by mixing nylon 66 and glass fiber in a weight ratio of 70:30. In Example 7 of Tables 1, a coating layer of TPO were formed on the pipe of PA66-GF30 by exchange mold injection. TPO is Santoprene 191-70PA, an olefinic thermoplastic elastomer of A.E.S. (Japan) Co., Ltd. Example 7 of Table 2 represents a known structure with a clip as shown in FIG. 1 and irrelevant specifications are omitted. Evaluation of Structures:

The structures according to the present invention and conventional ones were each evaluated for their properties as shown in Tables 1 and 2. Each structure was first evaluated for its initial properties as joined. Its initial evaluation included the visual inspection of the reinforcing yarn at the end of the hose through which the pipe had been press fitted. It was also evaluated for its sealing pressure (MPa). Then, the hose was pulled off the pipe for the evaluation of its pull-out load (N).

Each structure was also evaluated for its properties after application of an impact by a falling weight. The structure was mounted horizontally so as to have its longitudinal axis lying in parallel to the floor, and an iron ball having a weight of 500 g was allowed to fall on the structure from a height of 1 m. Its evaluation included the visual inspection of the inner surface portion of the hose contacting the stop projection on the pipe. It was likewise evaluated for its pull-out load (N) and its sealing pressure (MPa). No evaluation by application of an impact was made of the structure of Examples 3 and 5, since their initial evaluation had already revealed the displacement of yarn.

While the invention has been described by way of its preferred embodiments, it is to be understood that variations or modifications may be easily made by those skilled in the art without departing from the scope of this invention which is defined by the appended claims.

What is claimed is:

1. A structure comprising a flexible hose and a hard pipe,
   the hose having a wall with a reinforcing fiber layer and an inside diameter which is expanded by from 30 to 50% at one end, and
   the hard pipe having a portion press fitted in said one end of the hose, an annular stop projection formed about its press fitted portion, and a cross sectional contour including a gentle outward slope extending from the front end of said projection toward the rear end side to a first corner, which makes the angle of the subsequent second corner gentle, and a rear face of said second corner extending inwardly toward the longitudinal axis of said pipe at right angles thereto;
   and said reinforcing fiber layer is of reinforcing yarn having a pull-out thread strength of at least 0.3 N/mm.

2. A structure as set forth in claim 1 wherein the reinforcing yarn has been dipped in a surface treatment solution to impart the pull-out thread strength.

3. The structure as set forth in claim 2, wherein said pipe is branched or is not branched.

4. The structure as set forth in claim 2, wherein said pipe is coated with a thin layer of a soft elastomer covering at least said press fitted portion, or said projection.

5. The structure as set forth in claim 2, wherein said hose has an initial inside diameter which is smaller than the outside diameter of said pipe at the forward edge of said press fitted portion thereof.

6. The structure as set forth in claim 2, which is in combination with a radiator or a heater in an automobile engine compartment, a pipe of which is the hard pipe.

7. The structure as set forth in claim 2, wherein said pipe is of hard nylon.

8. The structure as set forth in claim 7, wherein said hard nylon is reinforced with glass fiber.

9. The structure as set forth in claim 2, wherein at least an innermost wall layer of said hose is formed from an elastomer having a tear strength of at least 20 N/mm.

10. The structure as set forth in claim 9, wherein said elastomer is EPDM (an ethylene-propylene-diene terpolymer), or EPM (an ethylene-propylene copolymer).

11. A hose connecting structure as set forth in claim 1, wherein said reinforcing fiber layer is of staple yarn or spunized yarn having a pull-out thread strength of at least 0.3 N/mm.

12. The structure as set forth in claim 11, wherein said pipe is branched or is not branched.

13. The structure as set forth in claim 11, wherein said pipe is coated with a thin layer of a soft elastomer covering at least said press fitted portion, or said projection.

14. The structure as set forth in claim 11, wherein said hose has an initial inside diameter which is smaller than the outside diameter of said pipe at the forward edge of said press fitted portion thereof.

15. The structure as set forth in claim 11, which is in combination with a radiator or a heater in an automobile engine compartment, a pipe of which is the hard pipe.

16. The structure as set forth in claim 11, wherein said pipe is of hard nylon.

17. The structure as set forth in claim 16, wherein said hard nylon is reinforced with glass fiber.

18. The structure as set forth in claim 11, wherein at least an innermost wall layer of said hose is formed from an elastomer having a tear strength of at least 20 N/mm.

19. The structure as set forth in claim 18, wherein said elastomer is EPDM (an ethylene-propylene-diene terpolymer), or EPM (an ethylene-propylene copolymer).

* * * * *